Oct. 21, 1958
C. W. BRABENDER ET AL
BEAM-CONVEYOR FOR CONTINUOUS
WEIGHING OF FLOWABLE SOLIDS
2,857,151
Filed Nov. 29, 1956
9 Sheets-Sheet 1
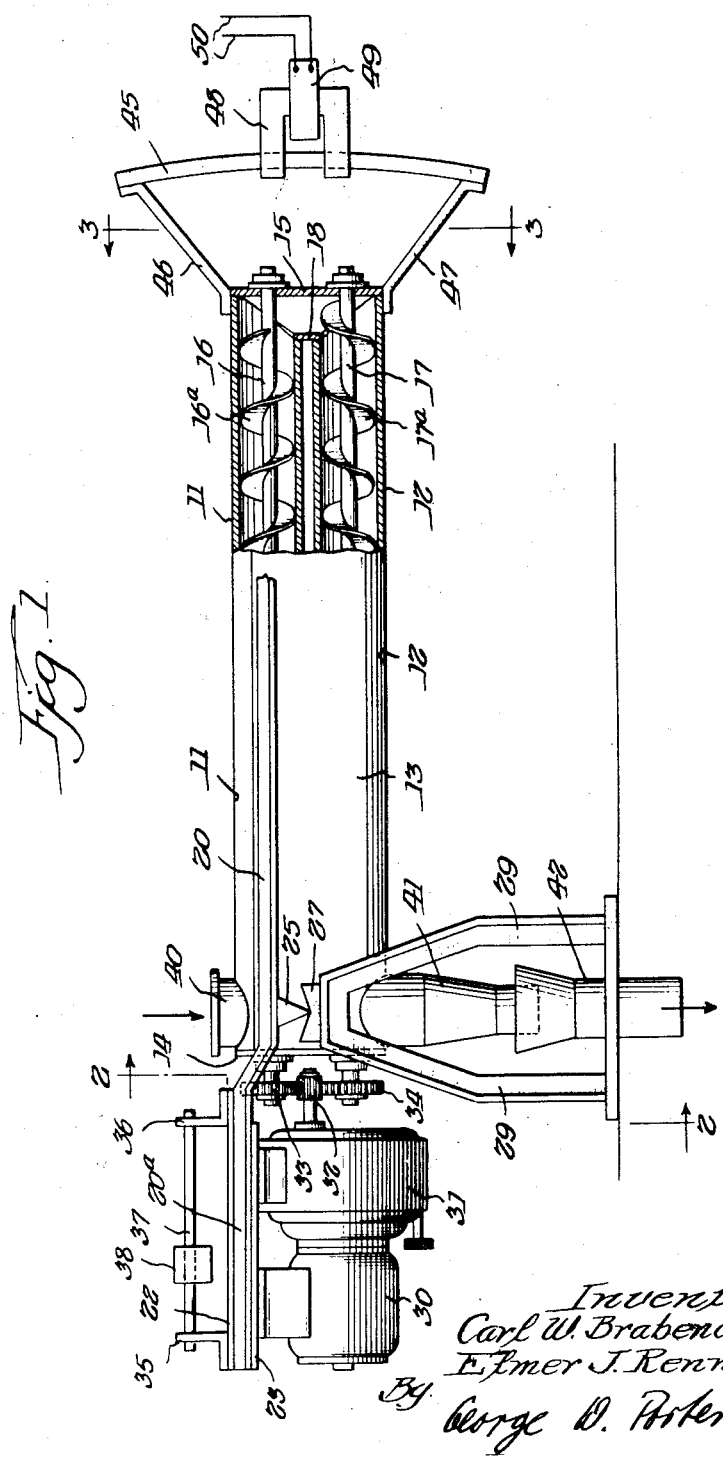
Inventors,
Carl W. Brabender, &
Elmer J. Renner.
By George D. Porter Atty.

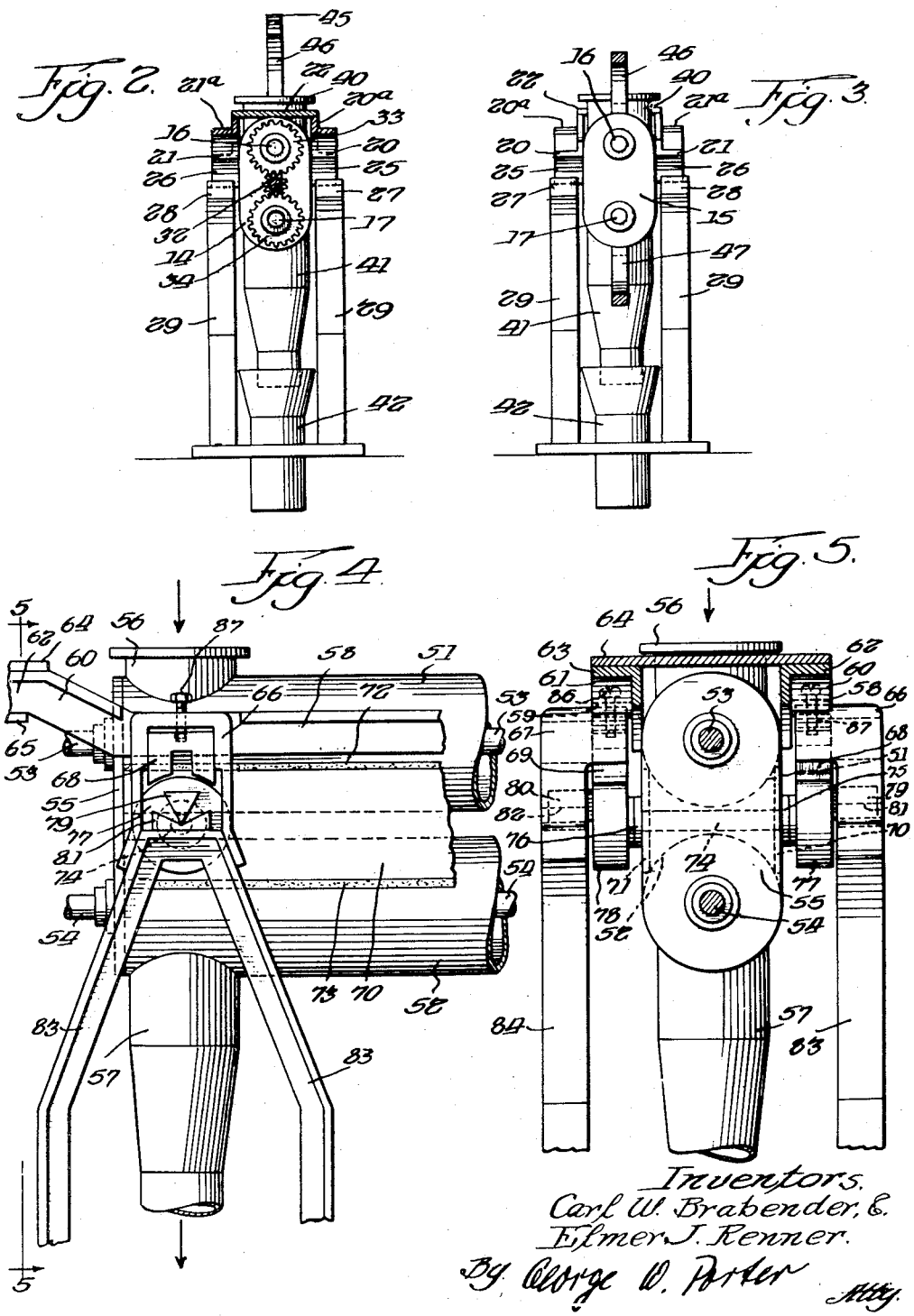

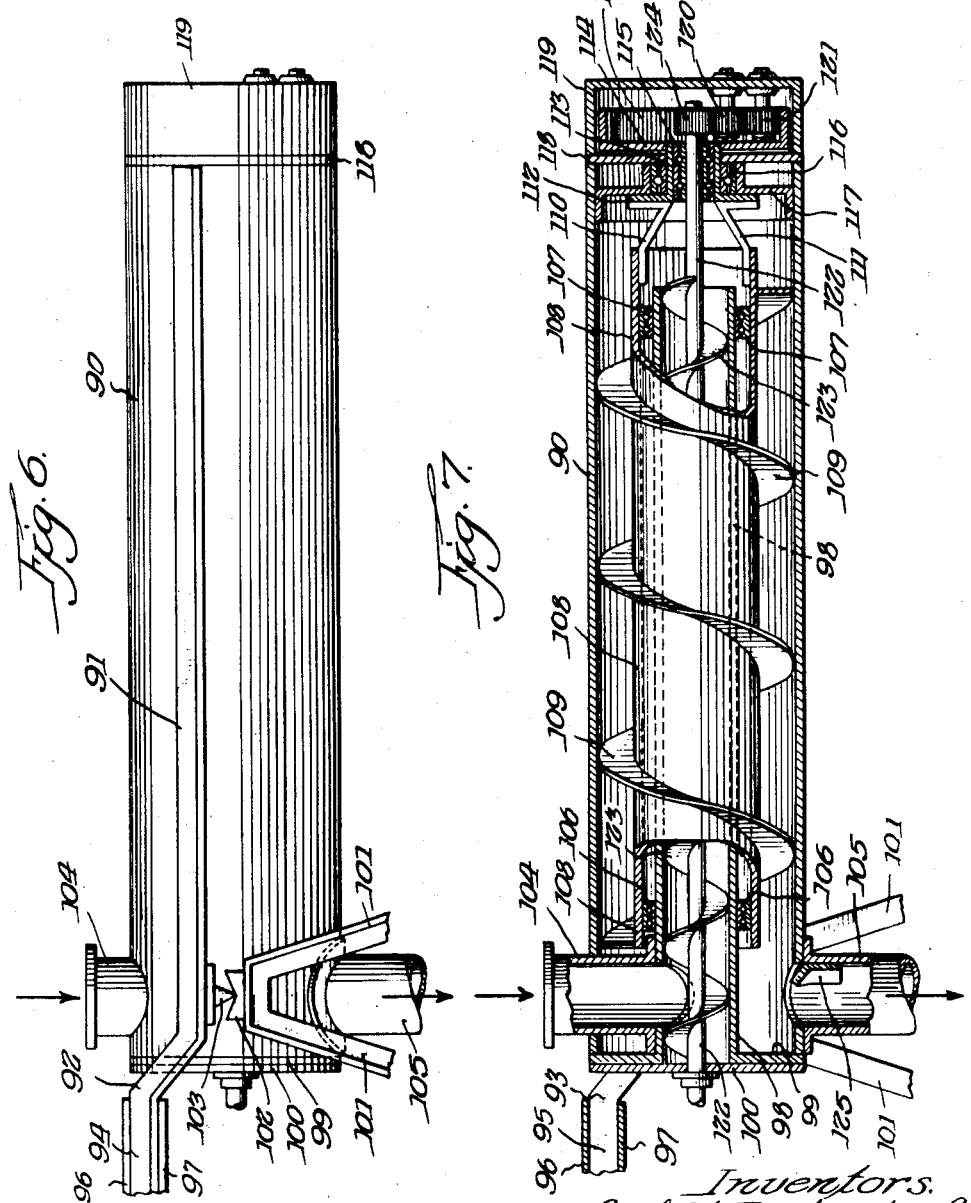

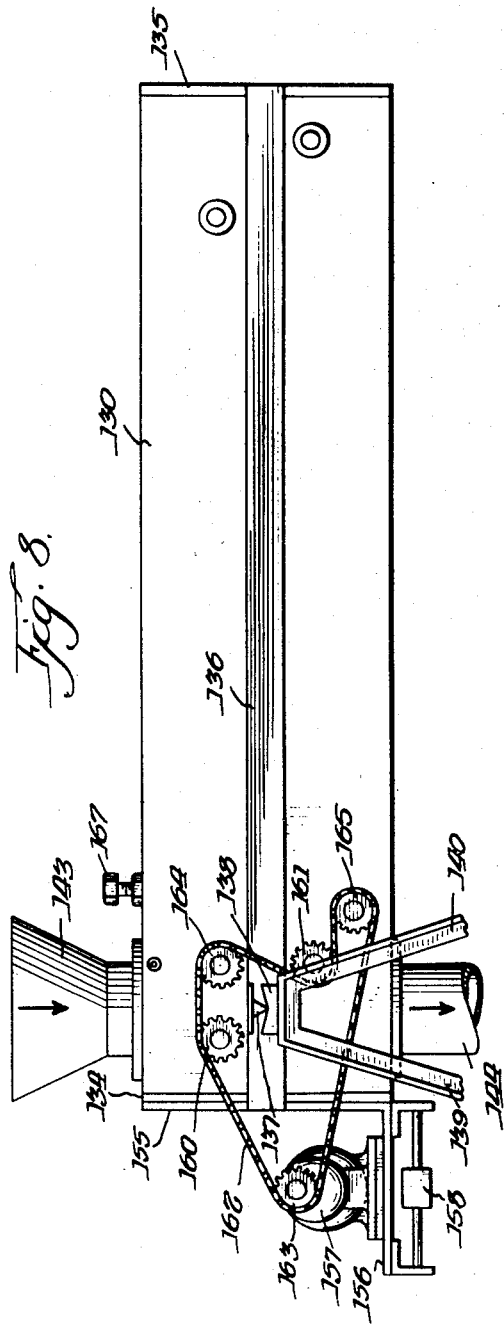
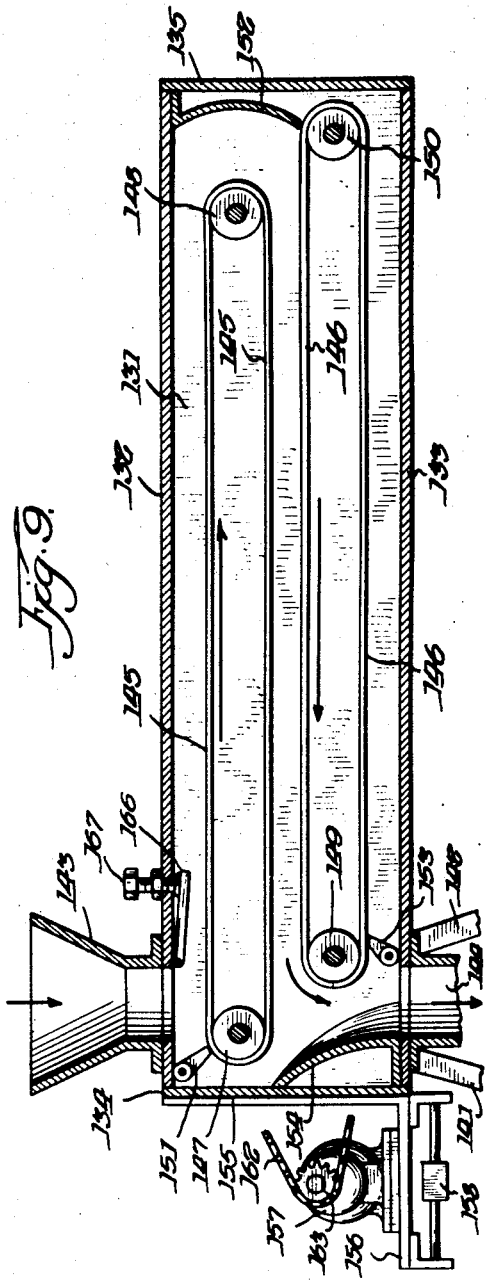

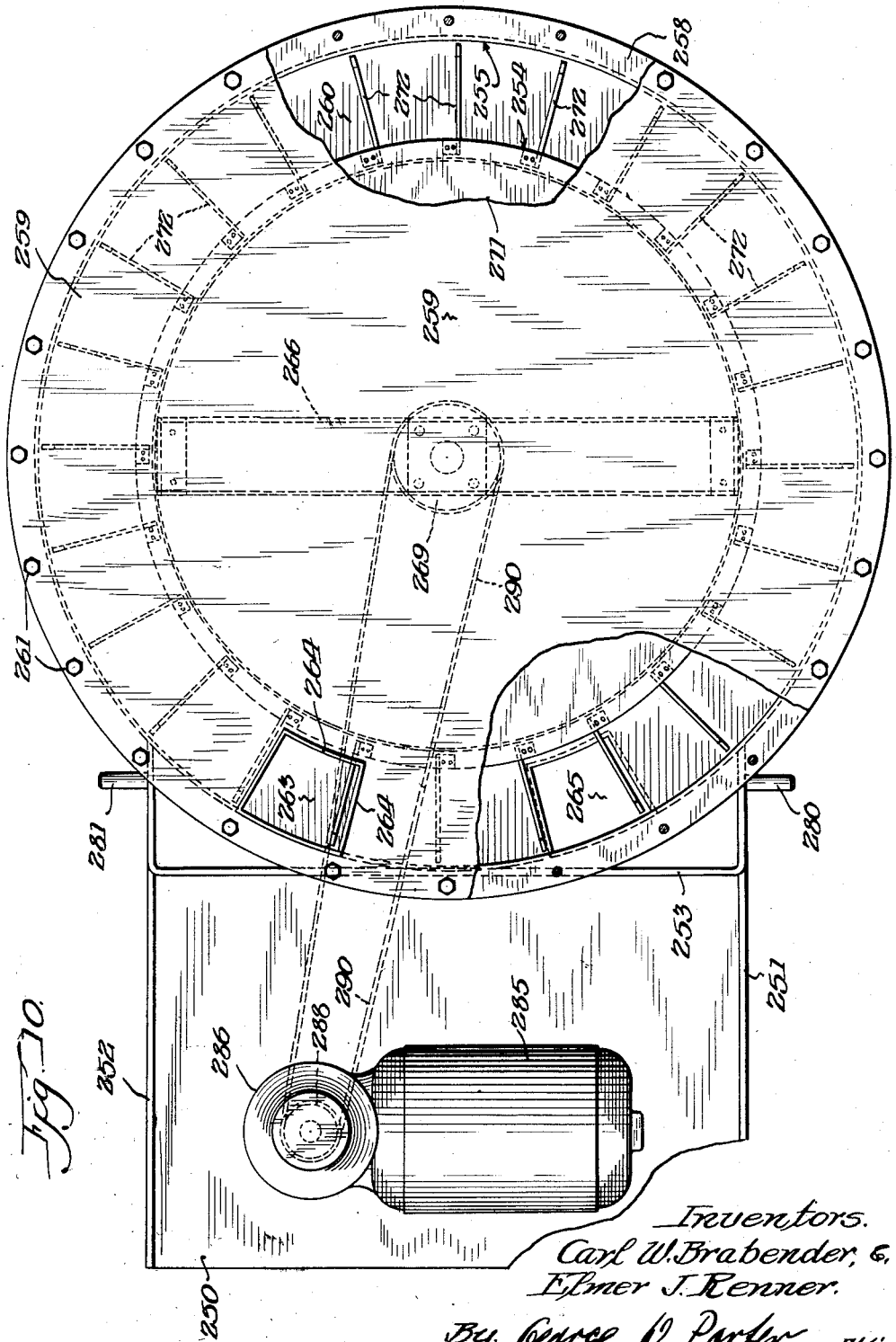

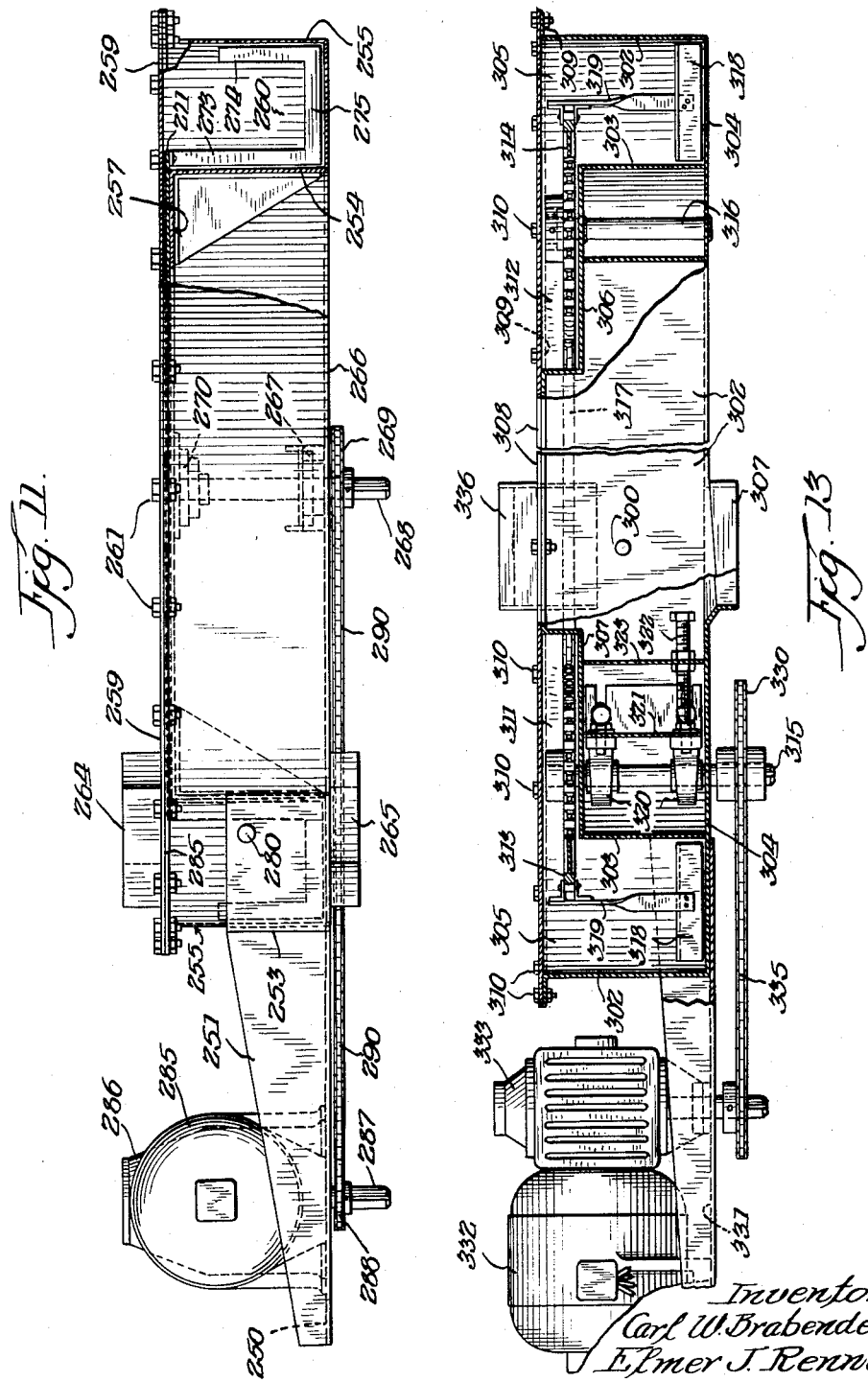

Oct. 21, 1958

C. W. BRABENDER ET AL
BEAM-CONVEYOR FOR CONTINUOUS
WEIGHING OF FLOWABLE SOLIDS 2,857,151

Filed Nov. 29, 1956

Inventors,
Carl W. Brabender &
Elmer J. Renner.

By George W. Porter
Atty.

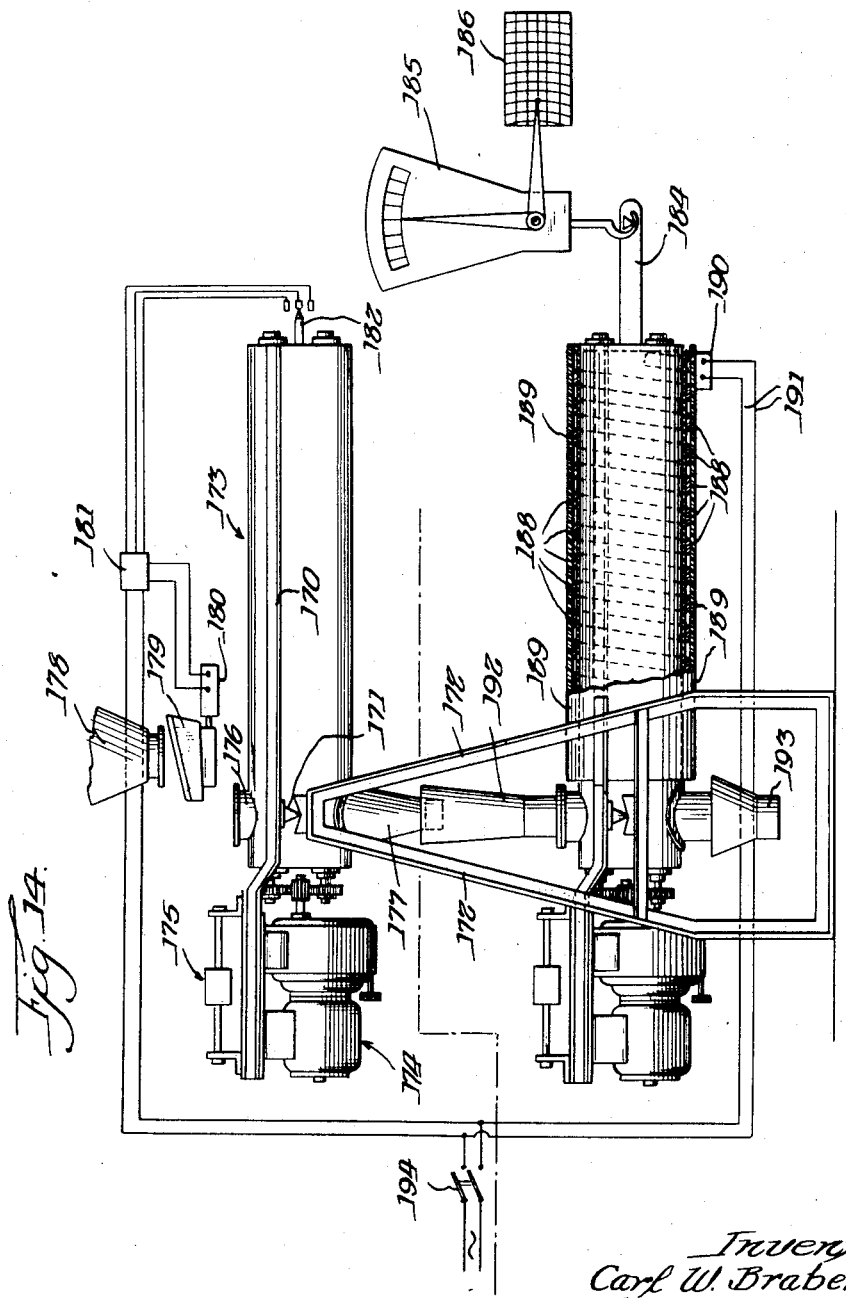

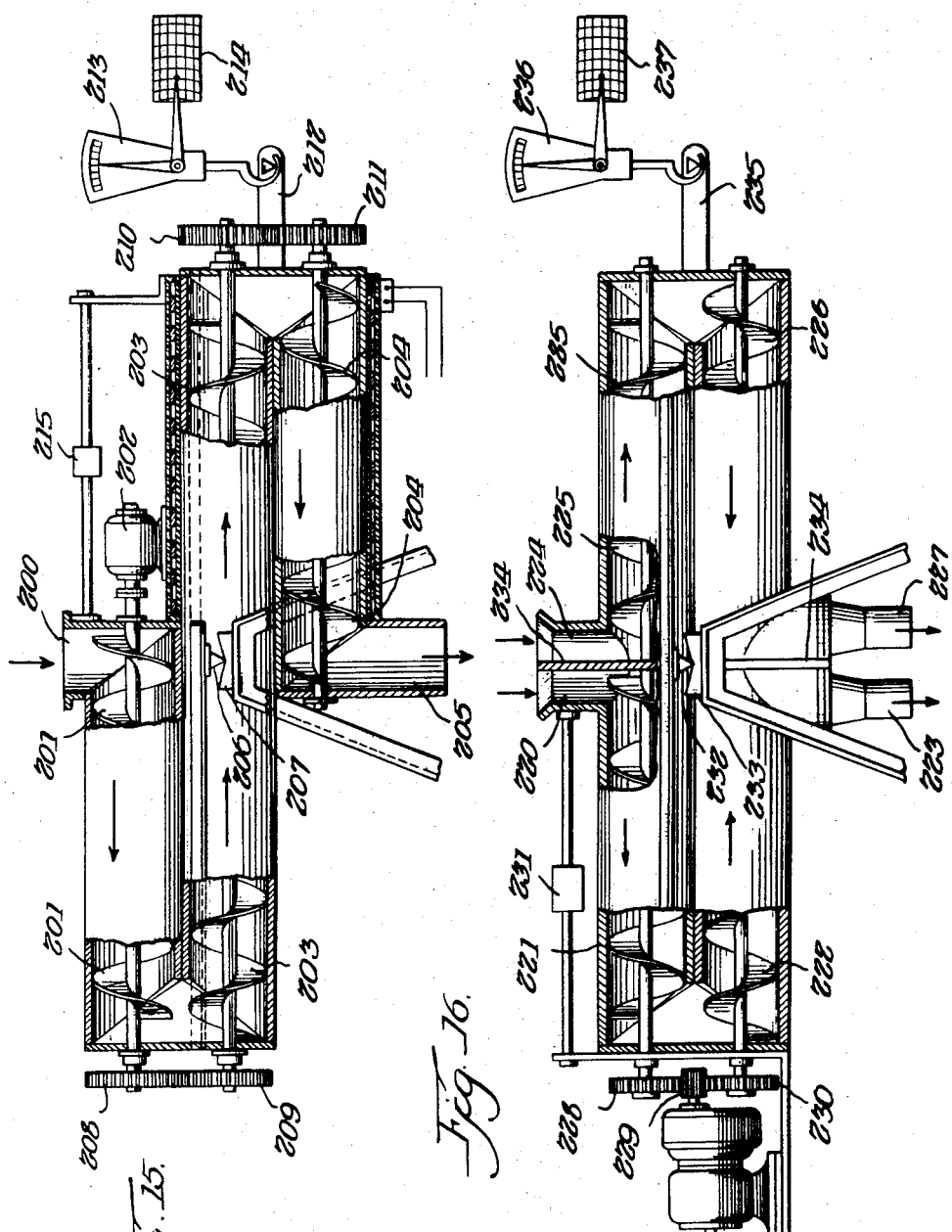

United States Patent Office 2,857,151
Patented Oct. 21, 1958

2,857,151

BEAM-CONVEYOR FOR CONTINUOUS WEIGHING OF FLOWABLE SOLIDS

Carl W. Brabender, Minneapolis, Minn., and Elmer J. Renner, Aurora, Ill., assignors to Pillsbury Mills, Inc., Minneapolis, Minn., a corporation of Delaware Application November 29, 1956, Serial No. 625,026

30 Claims. (Cl. 265—28)

This application is a continuation-in-part of copending application Serial No. 166,442, filed June 6, 1950, now abandoned. The invention relates to apparatus for controlling flowable solid materials during the processing thereof.

The term "processing" or equivalent language, unless otherwise specified, is intended to refer to any desired material-handling or production operation to which the invention may be applied; and the term "controlling" is similarly intended to refer to any desired governing, supervising, checking, signalling, recording or similar operation that may be applied by the invention to the material to be handled. Grain and grain products, for example, wheat and flour, may be mentioned as examples of "flowable solid materials."

A production operation may reside, for example, in the controlled transporting or feeding of a material such as grain or wheat prior to, during or after the processing thereof; or it may reside in the controlled addition of predetermined liquid or solid matter to grain, wheat or flour, or in the removal of a predetermined substance, for example, water, from flour; or it may reside in the comparison of the quantity of wheat with the quantity of a grade of flour extracted therefrom.

The control exercised by the invention may reside in the continuous gravimetric feeding of wheat, grain or flour, in a flour mill, at a constant or at a variable rate of flow; or it may reside in automatically governing the addition of tempering water to grain to maintain a predetermined rate of tempering; or in automatically governing the addition of another material such as a vitamin, powdered milk, dried egg or the like, to flour in a definite proportional relationship; or in subjecting a material such as flour to heat treatment to evaporate moisture therefrom for the purpose of determining its moisture content; or in similarly heat-treating soya bean meal to determine its residual solvent content; or it may reside in establishing the weight relationship between two materials, for example, wheat and a certain grade of flour, for the purpose of determining the yield or percentage of extraction of flour from the wheat.

The control as indicated in the foregoing examples may in each instance include local and/or remote "metering" of the corresponding processing or production operation; that is, it may provide for the signalling, indicating and/or recording of the particular operation in any desired and appropriate production terms.

In accordance with the principal object of the invention, the production and control operations referred to in the foregoing paragraphs may be practiced by employing a novel continuous weighing apparatus having a pivotally supported weighing beam which is not affected by the positive and the negative impacts of the material fed thereto and discharged therefrom, respectively. The designation "positive impacts" refers in this connection to impacts on the weighing beam that may be caused by load variations due to fluctuations in the gravitational feeding of a stream of material thereto; and "negative impacts" refers similarly to variations that may be caused by uneven sloughing off of material from the weighing beam incident to the discharge thereof from the beam.

The novel continuous weighing apparatus comprises a pivotally supported weighing beam provided with inlet and outlet means and having conveyor means for moving a gravitationally supplied stream of a flowable solid material laterally with respect to the zone defined by the inlet means for gravitational discharge along the zone defined by the outlet means. The inlet and outlet means are respectively disposed directly above and below the pivots of the weighing beam and form open areas above and below the conveyor means which extend relative to the conveyor means substantially equally from either side of a vertical line which intersects the axis of the pivot means so as to direct the respective gravitationally moving material feed and discharge along either side of such vertical line. The axes of the tubular inlet and outlet means may be disposed on a common axis which intersects the axis of the pivot means of the weighing beam. The pivot supports therefore absorb the positive and the negative impacts of the gravitational feed and discharge of the material, and these impacts cannot affect the weighing operations of the beam.

The resulting apparatus operates with a high degree of accuracy, and can be used for the control and handling of materials such as wheat and flour, as well as in other instances demanding exact weighing of a material for processing purposes.

Some of the specific objects may be briefly summarized as follows:

One object is to provide a weighing apparatus of the class mentioned above, which comprises a pair of conveyor means disposed alongside one another, one for moving the gravitationally supplied material laterally away from the inlet zone and the other for moving it laterally in return direction for gravitational discharge at the outlet zone.

Another object is to provide a weighing apparatus as specified in the preceding paragraph, in which the conveyor means comprises two screw conveyors one disposed above the other.

A further object is to provide a pair of coaxially arranged screw conveyors forming part of the weighing beam of the new apparatus.

Still another object is to provide a weighing beam structure comprising a pair of belt conveyors for moving the material to be weighed or controlled laterally of the inlet and discharge zones.

A further object is to provide a weighing apparatus comprising a Redler conveyor of the side-pull type for moving the material as indicated before. The casing containing the conveyor may be circular or elongated.

Another object is to provide a weighing apparatus having a casing forming part of a balanced weighing beam comprising conveyor means and means for heating the material prior to or during its lateral motion under the control of the conveyor means to extract from it a liquid component which responds to heat treatment by evaporation. The liquid component may be, for example, water, as in the case of using the invention in the moisture determination of flour, or it may be a solvent such as hexane in the determination of solvent residue in soya bean meal.

A further object is to provide a weighing apparatus having a weighing beam comprising conveyor means for moving material laterally of the inlet and outlet zones, and means for adding matter to the material ahead of its lateral movement by the conveyor means. The matter may be, for example, a liquid such as tempering water added to grain, or it may be a comminuted solid such as a vitamin powder, powdered milk, dried egg or the like, added to flour.

Still another object is to provide a weighing apparatus for use in the nature of a differential flowmeter, in which two materials, such as wheat and flour, are separately gravitationally delivered to the weighing apparatus for the purpose of determining the weight differential therebetween, either in terms of weight, volume or percentage of extraction of flour from wheat, as may be required for any desired production control purposes.

The foregoing and additional objects and features will be brought out in the detailed description which is rendered below with reference to the accompanying drawings. In these drawings, Fig. 1 shows in diagrammatic elevational side view, partly in section, an embodiment of a pivotally mounted weighing beam comprising screw conveyor means disposed in parallel one above the other;

Figs. 2 and 3 are end views of the weighing beam, as seen when looking in the direction of the arrows along lines 2—2 and 3—3 in Fig. 1;

Figs. 4 and 5 are somewhat enlarged fractional views of apparatus such as shown in Fig. 1, illustrating means that may be incorporated therein for magnetically relieving pivot friction;

Figs. 6 and 7 show in diagrammatic manner an elevational side view and a sectional view, respectively, of a weighing beam comprising coaxially disposed screw conveyor means;

Figs. 8 and 9 represent in diagrammatic elevational side view and in sectional view, respectively, a weighing beam made in accordance with the invention, comprising belt conveyor means;

Fig. 10 is a top elevational view of essential parts of a circular weigher comprising a Redler conveyor of the side-pull type, partly broken away to show details;

Fig. 11 shows a side elevation of the weigher of Fig. 10, partly broken away to indicate details;

Fig. 13 shows a side elevational view of the weigher of Fig. 12, partly broken away to indicate details;

Fig. 14 shows an example of using apparatus of the invention, with some parts indicated in section, in a combination functioning as a gravimetric feeder and as a flowmeter, respectively, in determining the moisture content of a material such as grain or flour;

Figure 12:
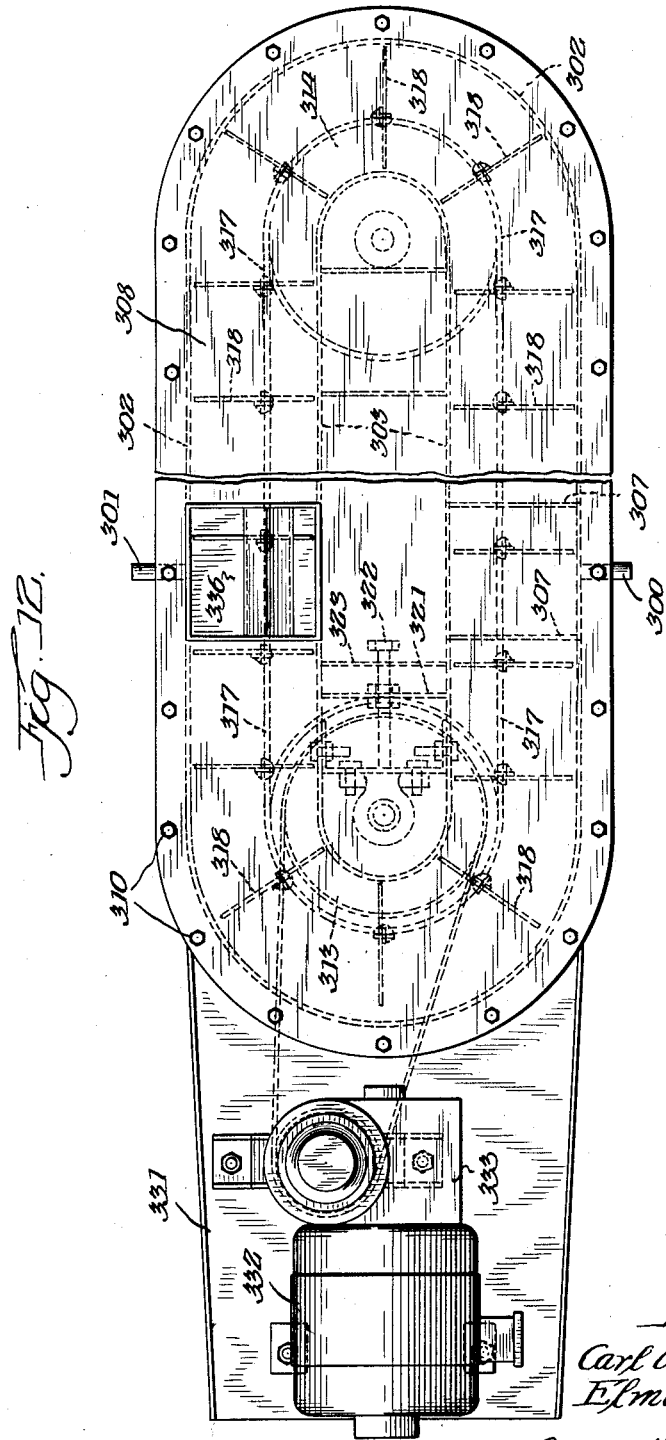
Fig. 12 is a top elevational view of a weigher comprising an elongated housing or casing containing a Redler conveyor of the side-pull type.

Fig. 15 is a diagrammatic representation, with some parts in section, of a continuous differential moisture meter or recorder; and Fig. 16 illustrates an embodiment of the invention, with some parts in section, for use as a differential flow conveyor scale adapted to meter, for example, to determine, indicate and record the differential between two rates of flow of different materials such as wheat and flour.

Like parts are indicated in the drawings by like reference numerals. Known details and elements will be referred to merely to the extent required for explaining the invention.

The apparatus illustrated in Figs. 1, 2 and 3 comprises two tubular casing members 11, 12 connected by a side wall 13 at the front and a similar side wall at the rear thereof. End plates or walls 14, 15 are provided for closing the tubular members 11, 12 at the opposite ends. Rotatably mounted in suitable bearings in the end walls 14, 15 are the shafts 16, 17 carrying the worm fins 16a and 17a, respectively, thus forming two screw conveyors arranged in parallel, one above the other. Portions of the walls of the casings 11, 12 are cut away near the right end of the device and are connected by a plate 18, thus providing a passageway connecting the outer ends of the upper chamber and lower chamber which accommodate the screw conveyors, as shown in the drawing. The longitudinal inner space between the two casing members, which is closed to the outside by the side walls such as 13, may be utilized for accommodating desired auxiliary control means, for example, heating means, for purposes which will be presently explained more in detail. Secured to the side wall 13 is an angular mounting and supporting strip 20, and secured to the opposite side wall is a similar angular strip 21. These strips reinforce and unite the various parts of the device to form a unitary structure. At the left end, the supporting strips are bent upwardly at an angle, forming the elevated angular portions 20a and 21a which support the mounting plates 22 and 23.

Wedge-shaped pivot or fulcrum members 25, 26 depend from the angular strips 20, 21. These members engage the fulcrum or pivot blocks 27—28, respectively, which in turn are mounted on top of standards or uprights having the legs 29, one such upright on either side of the device. Different pivot means, for example, ball bearings, may take the place of the fulcrum pivots shown in this structure as well as in any one of the other embodiments disclosed herein.

Secured to and depending from the mounting plate 23 is the drive unit comprising the motor 30 and the gear reducer 31. This drive unit operates a pinion 32 which meshes with gear wheels, one for the conveyor shaft 16 and one for the conveyor shaft 17. On top of the mounting plate 22 are disposed suitable brackets 35, 36 accommodating a shaft 37 on which is slidably disposed a balance or counterweight 38.

The drive unit and the counterweight balance the portion of the structure at the right of the axis of the pivot means 25/27—26/28. The structure thus forms a weighing beam for material to be gravitationally supplied thereto through the inlet 40, the median center line of which intersects the axis of the pivot means. An outlet 41 is provided for gravitationally discharging the material into a funnel 42. The median center line of the outlet coincides with that of the inlet and therefore also intersects the axis of the pivot means.

In operation, the drive unit 30/31 rotates the pinion 32 and therewith the gear wheels 33—34 meshing with it, thus rotating the two worms or screws 16a—17a. The material delivered to the inlet 40 falls along either side of a vertical line which intersects the axis of the pivot means, enters the upper casing chamber 11 and is moved laterally outwardly to a point near the free right end of the weighing beam, where it falls through the connecting passageway into the lower casing chamber 12 containing the screw conveyor 17a. This latter screw conveyor moves the material laterally inwardly over a parallel path, for gravitational discharge through the outlet 41.

The feed and the discharge means 40, 41, being respectively disposed above and below the axis of the pivot means 25/27—26/28, and forming open areas extending on either side of a vertical line which intersects the pivot axis, thus guide and direct the respective gravitational feed and the discharge streams along either side of such vertical pivot-intersecting line. The positive impact of the material falling into the upper conveyor chamber is thus absorbed by the beam pivots, and the negative impact of the material leaving the device is similarly absorbed thereby. These impacts accordingly have no appreciable effect on the weighing operations of the beam. The accuracy of the operation remains substantially unaffected.

In order to secure the desirable high degree of accuracy, there may be provided substantially frictionless means for feeding current to the drive unit 30/31. Such frictionless means may be of any desired known and approved type, including provision of conductors surrounding the axis of the beam pivot in the manner of hairsprings; or it may be, for example, conductors wired to stationary contacts immersed in mercury contained in corresponding chambers in a suitably mounted vessel.

Any other known and suitable substantially frictionless current feed may be used.

At the free end of the weighing beam is provided an arcuate member 45 which may be secured thereto by arms such as 46, 47. A magnet 48 may be suitably mounted, its poles embracing the arcuate member 45. The magnet may be a permanent magnet, or it may be provided with an exciting coil 49 fed by current over conductors 50. This arrangement forms eddy current means for damping the oscillations of the weighing beam or scale during operation thereof. An eddy current damping means has been shown to give an example, it being understood that any other known and approved suitable damping device may be used, including a dashpot damper or a gyroscope type flywheel damping device, which may be mounted, for example, on the motor shaft and extend therefrom at the left end of the structure.

Referring again to the positive and the negative impacts caused by the material incident to the feed thereof to the weighing beam and incident to the discharge therefrom, respectively, which are absorbed by the pivot means 25/27 and 26/28, known gravimetric feeders do not provide the feature of placing the inlet and the discharge means in alignment with the pivot of the beam and are therefore affected by sudden and unpredictable load fluctuations at the feed and discharge zones. These fluctuations not only affect the accuracy of the operation of the weighing beam, but also make known damping devices quite ineffective. In the present case, simple known damping devices may be satisfactorily used, as described before.

The apparatus shown in Figs. 1, 2 and 3 and described above may be employed for control and processing operations, in a manner which will presently be explained in detail.

It may be desirable, in weighing scale structures of the type disclosed herein, and particularly in structures which require great sensitiveness, to suspend the pivots or bearings and therewith the weighing beam so as to relieve and reduce pivot friction to an indispensable and operationally harmless minimum. This may be done by using the arrangement diagrammatically indicated in Figs. 4 and 5.

As shown in these figures, there are again two tubular casings 51, 52 forming chambers for conveyor screws carried on the shafts 53, 54. The two casings are connected at one end by an end plate 55, and a similar end plate connects them at the opposite end thereof. An inlet 56 is provided for supplying material to be handled to the conveyor element in the upper tubular casing 51, and an outlet 57 is similarly provided for gravitationally discharging the material from the tubular casing 52. As in the structure described before, the material supplied at the inlet 56 is moved laterally away from the inlet zone, to the right, as shown in Fig. 4, and the flow is then reversed in the same manner as discussed in connection with Fig. 1, at the right end of the casing 51, the material dropping into the casing 52 and being moved to the left for gravitational discharge at 57. The upper casing carries again angular mounting and reinforcing strips 58, 59 which are angularly bent upwardly, as indicated at 60, 61, to form the raised or elevated portions 62, 63 on which are secured the mounting plates 64, 65 corresponding to the mounting plates 22 and 23 shown in Fig. 1, which hold a suitable drive unit and a counterbalance weight, as already described. All the parts so far referred to correspond to similar parts in the structure shown in Figs. 1–3. Secured to each of the standards or uprights 83—84 is a generally U-shaped mounting member, as indicated at 66 and 67, respectively, each holding a magnet, as indicated at 68, 69. Plates 70, 71 are provided one on each side of the conveyor casings, corresponding to similar plates in Figs. 1–3, each of these side plates being welded to the casing walls, as indicated in Fig. 4 at 72, 73. A shaft 74 is disposed between the side plates 70, 71 and is suitably held in position, for example, by bushings 75, 76. The shaft carries at each free end a steel drum, as shown at 77 and 78, and secured to each drum is a wedge-shaped fulcrum member, as indicated at 79, 80. These fulcrum members coact with fulcrum blocks 81, 82 carried on the uprights 83, 84. The position of the poles of the magnets 68, 69 with respect to the steel drums 77, 78 is adjustable by suitable means carried by the corresponding mountings 66, 67, for example, by means of adjusting screws indicated at 86, 87.

The unit described above with reference to Figs. 4 and 5 is thus identical in structure and operation with that shown in Figs. 1, 2 and 3, except that the movable pivot means is subjected to an adjustable magnetic upward pull to reduce pivot friction to an operationally harmless minimum.

The arrangement furnishes as a by-product the advantage of also operating in the manner of damping means by magnetic coaction of the poles of the magnets 66, 67 with the steel drums 77, 78 which are pivotally mounted with the weighing beam.

It is understood that the magnetic pivot friction relief and damping means is applicable to wedge-shaped fulcrum means as well as to other bearing or journal structures, and that it may be applied in any of the embodiments disclosed herein.

The weighing beam shown in Figs. 6 and 7 comprises again two worm or screw conveyor elements which are adapted to move material laterally of an inlet zone and back again over a parallel path, for discharge at an outlet zone which is in alignment with the inlet zone, the median center lines of the two zones being disposed in intersecting relationship with the pivot of the structure. In this particular case the two screw conveyor elements are arranged coaxially.

The structure comprises a cross-sectionally circular tubular outer casing or housing 90 provided with angular reinforcing and mounting rails or strips 91, one on either side, these strips being again bent upwardly, as indicated at 92, 93, to form elevated mounting portions 94, 95 extending from the left end of the casing 90 and carrying the mounting plates 96, 97 which correspond to the mounting plates 22 and 23 of the structure shown in Figs. 1, 2 and 3. Secured to these mounting plates may again be a drive unit and a counterbalance weight as shown in Fig. 1. The weight of the casing 90 and its interior parts is thus again balanced by the weight of the drive unit and by the weight of the counterbalance, and the entire structure is adapted to operate as a unitary weighing beam. The beam may be adjusted to remain in balance or equilibrium by adjusting the counterbalance to a desired position in accordance with the amount of material which is being moved within the casing 90.

An inner tubular conveyor casing 98 is provided, carrying a flange 99 which is secured to the corresponding inner end of the outer tubular housing 90 to form a rigid unit therewith. An end plate 100 is suitably secured to the flange 99 of the inner casing 98. This unitary assembly, namely, the outer casing 90 and the inner casing 98, is pivotally mounted on uprights such as 101, one on either side of the structure, each upright supporting a pivot shown again in the form of a fulcrum block such as indicated at 102 coacting with a wedge-shaped fulcrum member 103 which is secured to a reinforcing and supporting rail 91, one such rail being disposed at either side of the structure and suitably secured to the outer casing 90. An inlet 104 is provided for gravitationally delivering to the inner casing 98 material to be handled therein, and an outlet 105 is provided for gravitationally discharging material from the outer casing 90. The axes of the inlet and outlet zones are again in alignment with the axis of the pivot means. A baffle 125 in the outlet 105 guides the gravitational flow of the material for discharge along either side of the median center line thereof.

Ball bearings 106 and 107 are provided on the inner stationary casing 98 for rotatably journalling the tube 108 carrying screw or worm fins 109. The free right end of the tube 108 carries spider arms 110, 111 secured to the flange 112 of a bushing 113 which in turn carries at its free outer end the radial portion 114 of an internal gear 121a. The bushing 113 is rotatable on a ball bearing 115 and carries in turn a ball bearing 116 disposed within a tubular insert member 117. The latter is mounted within the outer casing 90. A partition wall 118 is suitably secured to the free outer end of the outer casing 90, and to this partition wall 118 is attached the closure cap 119. The latter carries an idler pinion 120 and a drive pinion 121 meshing with the internal gear 121a. Within the inner stationary casing 98 is provided a screw conveyor comprising the shaft 122 carrying the worm fins 123. The screw 122/123 is driven by a motor unit such, for example, as already described with reference to Fig. 1. The screw shaft 122 carries a pinion 124 which meshes with the idler pinion 120 carried by the closure cap 119.

The operation of the unit is believed to be apparent from Figs. 6 and 7, but may be briefly summarized as follows:

The structure forms an adjustably balanced pivotally mounted weighing beam, as in the previously described embodiments. The drive unit rotates the internal conveyor screw 123, thereby rotating, by means of the pinion 124, the idler pinion 120 which in turn rotates the drive pinion 121 meshing with the internal gear 121a. The latter therefore rotates the bushing 112/113 and therewith the conveyor screw 108/109 which is secured thereto by means of spider arms 110 and 111, the conveyor screw 108/109 rotating on the inner stationary casing 98 through the medium of the ball bearings 106, 107. Material is delivered gravitationally at the inlet 104, as in the previously described structures, and is moved by the screw 122/123 laterally of the inlet zone through the stationary inner casing 98 to the outer end thereof, where the material is picked up by the screw 108/109 which moves the material to the left over a parallel path for gravitational discharge through the outlet 105. Any load variations deviating from a predetermined zero setting of the weighing beam will unbalance the beam for control indicating, metering, recording or processing purposes, as mentioned before.

The ball bearings 106, 107 may be protected against ingress of foreign matter in any suitable and approved way. The ball bearings at the right end of the structure are protected by the arrangement shown, which may be supplemented by the addition of suitable protecting gaskets, as desired. The gears at the right end of the beam are protected by the closure cap 119.

The above described structure may be modified by the use of a double-walled inner tubular casing in place of the inner casing 98, to form an annular inner space for accommodating auxiliary control means, for example, suitable heating means, for purposes which will be presently explained more in detail.

Belt or Redler type conveyor devices may be employed to accomplish the purposes of the invention. An example of an embodiment using belt type conveyor means will now be described with reference to Figs. 8 and 9.

The scale or weighing beam comprises in this case a casing having the side walls 130—131, top and bottom walls 132—133 and end walls 134—135. A reinforcing and supporting strip or platelike member 136 is provided on each side of the casing, each carrying suitable pivot means shown again in the form of wedge-shaped fulcrum elements 137, for coaction with fulcrum blocks 138. The fulcrum blocks are mounted as before, on uprights or standards, one on each side of the structure, having the legs 139—140 and 141—142, respectively. Aligned with the pivot means is the inlet 143 and the outlet 144 in a manner already described.

Within the casing are provided the endless belt conveyors having the belts 145—146, the first being supported by a drive roller 147 and an idler roller 148, and the second being supported by a drive roller 149 and an idler roller 150. A pivotally mounted brush or rubber wiper 151 is provided for coaction with the belt 145, the upper flight of which moves to the right, as indicated in Fig. 9 by the arrow. This wiper may be spring-biased in clockwise direction and has the dual purpose, first, of guiding the gravitational delivery flow of the material from the inlet 143 onto the upper flight of the belt 145, thus preventing deposit of material in the space at the left of the drive drum 147 and consequently discharge thereof downwardly to the outlet 144, thus escaping weighing; and, second, of keeping the upper flight of the belt 145 clean for receiving the stream of material to be weighed. An interior baffle 152 is provided at the right end of the structure for the purpose of guiding the material dropping from the upper flight of the belt 145 downwardly onto the upper flight of the belt 146 and also preventing material from dropping downwardly and accumulating in the space at the right and below the idler drum 150 of the lower conveyor belt. Another brush or rubber wiper member 153 is provided for coaction with the lower flight of the belt 146 at the extreme left end thereof beneath the drive drum 149. This wiper may be spring-biased in counterclockwise direction, and has the dual purpose of guiding material dropping from the upper flight of the belt downwardly to the outlet 144 and keeping the lower flight of the belt clean, thus preventing accumulation of material in the space below such lower flight. The baffle 154, indicated at the left end of the structure, serves the purpose of guiding material from the lower conveyor belt into the outlet 144 and also preventing accumulation of material in an interior dead space above and at the left of the outlet.

An angular mounting plate 155 is secured to the inner end plate 134 of the beam casing, forming a pedestal-like support 156 for mounting the drive unit comprising the motor and gear reducer 157 and the counterweight 158. Secured to the shaft carrying the drive roller 147 of the upper belt conveyor is the drive sprocket 160, and similarly secured to the shaft carrying the drive roller 149 for the lower conveyor belt is the drive sprocket 161. These sprockets are driven by a chain 162 from the sprocket wheel 163 operated by the motor. Numerals 164, 165 indicate idler sprockets.

A skimmer and adjusting plate 166 may be provided, if desired, and pivotally mounted within the casing above the upper flight of the endless belt 145. The angular position of this plate with respect to the belt may be adjusted by suitable means shown in the form of a screw 167. This plate operates in the manner of a rake and skimmer to adjust the thickness of the layer of material which is moved to the right on the upper flight of the belt 145.

Idler rollers may be disposed at spaced intervals under the upper flights of the belts 145, 146 to support these belts in the case of relatively long structures, where such supports may be desirable.

A longitudinal double-walled partition may be provided between the lower flight of the upper belt 145 and the upper flight of the lower belt 146, forming distinct chambers, one for each conveyor, as in the previously described structures. The inner space formed by such double-walled partition may be utilized for accommodating auxiliary inner control means, for example, heating means, for purposes which will appear as the description progresses.

Examples using Redler conveyors of the side-pull type will now be described with reference to Figs. 10 to 13.

The apparatus shown in Figs. 10 and 11 comprises a frame forming a shelf or a platform 250 with arms 251, 252 interconnected by a transverse brace 253. The inner ends of the arms 251, 252 are suitably secured, for example, welded, to a casing forming a circular cross-sectionally U-shaped trough or channel 260 defined by side walls 254, 255 and a bottom wall 256. Numeral 257 indicates a plate secured to the side wall 254 at the top thereof. A flange 258 extends from the side wall 255. A cover plate 259 is secured to the flange 258 by bolts 261 and coacting nuts 262. The cover plate 259 has an opening 263 formed therein defined by upwardly extending wall members 264 forming a funnel-like inlet for feeding to the channel 260 material to be processed. At the bottom of the structure is provided a similar opening defined by downwardly extending wall members 265 forming a material discharge.

A bar-like member 266 extends across the space defined by the inner side wall 254 of the channel 260 carrying a bearing 267. Through this bearing extends a shaft 268 carrying a sprocket wheel 269. The shaft 268 extends upwardly into and through another bearing 270 depending from the plate 257. The upper end of the shaft is fastened to a plate 271 extending between the plate 257 and the cover 259 and carrying circumferentially thereof wipers or scrapers 272, each wiper being generally U-shaped and having side arms 273, 274 interconnected by a bottom arm 275 as clearly indicated in Fig. 11. The wipers conform generally to the configuration of the channel 260. Rotation of the sprocket wheel 269 will accordingly rotate the shaft 268 to effect rotation of the plate 271 and therewith travel of the wipers 272 within and along the channel 260.

Assuming now that flowable material is fed to the channel 260 through the feed opening 263, such material will be transported by the wipers or scrapers (assuming clockwise rotation of the plate 271) from the feed inlet 263 to the discharge 265 for gravitational fall downwardly for deposit into suitable receiving means (not shown).

The arms 251, 252 of the frame are provided with pivot pins 280, 281 which may be journalled in bearings carried by suitable supports (not shown). Fulcrum members such as described in connection with previously discussed embodiments may be provided in place of the pivot pins 280, 281. The axis of the pivot pins or fulcrum members 280, 281 extends along a median center line intersecting the vertical axes of the feed inlet 263 and the discharge 265. It will be seen, therefore, that the fulcrum or pivot means will absorb the positive and the negative impact of the material feed to the channel 260 and discharge therefrom exactly as in the case of the previously described embodiments.

Upon the shelf or platform 250 of the frame is mounted a motor 285 coacting with a gear reducer 286 having a downwardly extending drive shaft 287 for driving a sprocket 288 which is interconnected with the driven sprocket 269 by a chain 290.

The shelf 250 with the drive means thereon, motor 285 and gear reducer 286, extending to the left of the pivot means 280, 281 balances the circular material handling casing extending to the right of the pivot means and forms therewith a weighing beam. An adjustable counterweight may be provided as desired or required to balance the structure in accordance with the requirements of a given material to be processed.

Supporting means for the weighing beam have been omitted to keep the showing of Figs. 10 and 11 simple. It is believed sufficient to state that suitable supports may be provided for pivotally supporting the fulcrum or pivot means 280, 281 analogous to the supports for the fulcrum or pivot means described in connection with the previously explained embodiments. Recording and/or indicating means analogous to those previously described may likewise be provided. It is understood that suitable and desired means may be provided for supplying current to the motor 285 and also switches and auxiliary controlled devices required or desired in any given practical use of the apparatus.

The operation is believed to be apparent from the explanations already supplied but may be briefly summarized as follows:

Assuming the motor 285 to be operating, the shaft 286 will be rotated through the median of the chain 290, thus rotating the plate 271 and therewith moving the wipers or scrapers 272 along the channel 260. Flowable material, for example, grain or flour, fed to the structure through the feed opening 263 will fall into the channel 260 and will be moved by the wipers 272 clockwise, as seen in Fig. 10, from the feed opening 263 to the discharge 265, falling gravitationally into suitable receiving means. Metering, recording and/or registering and other control operations may be performed in accordance with explanations given previously.

The structure shown in Figs. 12 and 13 is similar to the one just described in connetcion with Figs. 10 and 11 except the material handling casing is elongated instead of circular, thus requiring slightly modified means for moving the material from the feed to the discharge points.

Referring now to Figs. 12 and 13, numerals 300, 301 indicate pivot pins (other fulcrum means may take their place) which are journalled in suitable supports (not shown) in a manner discussed before. These pivot pins extend respectively from the parallel portions of the outer wall 302 of a cross-sectionally U-shaped casing having an inner wall 303 and forming with the bottom wall 304 an endless elongated channel 305. Secured to the inner wall 303 of the channel and extending therefrom at the opposite ends of the structure are shelf-like insert plates indicated at 306 and 307. A cover 308 is provided which is secured to a flange 309 extending from the outer wall 302 by means of bolts and coacting nuts indicated at 310. The shelves 306, 307 form with the cover 308 chambers 311, 312 for respectively accommodating sprocket wheels 313, 314 carried respectively by shafts 315, 316, the sprocket wheels supporting an endless chain 317. The chain carries wipers or scrapers such as indicated at 318, each wiper extending from an arm 319 fastened to the chain, each wiper being disposed slightly spaced from the bottom of the channel 305. The shaft 315 fastened to the sprocket wheel 313 is journalled in bearings 320 mounted on a plate 321 which is adjustable by a screw 322 in threaded engagement with a plate 323. The shaft of the sprocket wheel 314 is journalled in a bearing 324 which may be carried by the shelf 306 or by the cover 308. The tension of the chain may be adjusted by the screw 322.

The shaft of the sprocket wheel 313 extends downwardly through the casing wall and carries a sprocket 330. A platform or shelf 331 extends from the material handling casing to the left and on this shelf is mounted a drive motor 332 and a gear reducer 333, the latter having a downwardly extending shaft carrying a sprocket wheel 334 which is interconnected with the sprocket 330 by a chain 335.

The material handling casing is provided with a material inlet 336 disposed above one flight or run of the channel 305 (the top flight as seen in Fig. 12) and with the material discharge extending downwardly from the casing in alignment with the other flight of the channel (the bottom flight as seen in Fig. 12). The wipers or scrapers 318 travel along the channel 305 in clockwise direction as indicated by the arrow in Fig. 12.

The structure extending from the left of the pivots 300, 301 balances the structure extending therefrom to the right. A counterweight (not shown) may be provided as desired or required in accordance with explanations rendered in connection with the description of previous embodiments.

Structural supporting means, as well as recording, metering, registering, and various control means including current supply to the drive motor may be provided as required and as previously discussed.

The operation corresponds in every detail to that described with reference to the embodiments shown in Figs. 10 and 11. Material to be processed is supplied to the inlet 336 for gravitational fall into the channel 305. The drive motor 332 being assumed to be operating, the scrapers or wipers 318 move clockwise along the channel 305 moving the material along the channel for gravitational discharge at 307. The median center lines of the inlet and discharge are in alignment with the common axis of the pivots 301, 302 and the positive as well as the negative impacts are accordingly absorbed by the pivots and will not affect the accuracy of operation.

The embodiments illustrated in Figs. 10 to 13 result in advantages over and above the advantages of the previously described structures which include, among others (a) the use of a single conveyor element; (b) the material particles being conveyed and weighed remain substantially in the same relationship to each other and to the conveying means, as they are moved along the conveying channel from the inlet to the discharge, thus contributing to accurate operation; (c) in the circular weigher according to Figs. 10 and 11, all of the weighing and conveying of the material occurs on one side of the pivot axis; the material is not carried beyond the feed and discharge points and accumulation of material that might disturb the balance is thus avoided; (d) the circular weigher according to Figs. 10 and 11 makes for a shorter weighing beam which is an advantage where space has to be considered; (e) piling up and sloughing off of the material at either end of the conveyor that might affect accuracy of operation cannot occur and special means for preventing such piling up or sloughing off may be omitted; (f) the conveying-weighing element is in both embodiments disposed on one plane definitely eliminating the dropping of the material from an upper to a lower flight or run and thus further contributing to accurate operation; (g) there are no corners in which the material can accumulate on either side of the pivot axis; and (h) general structural simplicity.

Any one of the embodiments noted in the foregoing explanations may be used for handling a desired flowable solid material. Examples of using such units for production control purposes, for instance, in a flour mill, will now be given with reference to Fig. 14.

It will be assumed, referring first to the apparatus shown in Fig. 14 above the dot-dash line thereof, that a weigher unit made in accordance with the invention, for example, the weigher shown in detail in Figs. 1-3, is to be used as a gravimetric feeder for grain or flour.

The structure comprises a supporting rail or strip 170 for pivotally mounting at 171 on uprights 172 the unit including conveyor casing, the motor drive and a counterweight, as generally indicated at 173, 174 and 175, respectively. Disposed in the casing 173 are the two screw conveyors for diverting the stream of a desired material, for example, flour, which is gravitationally delivered to the inlet 176, laterally away from the inlet zone and then back again over a parallel lateral path laterally inwardly for gravitational discharge at the outlet 177. It is of course understood that the structure may be equipped with suitable frictionless means for supplying current to the motor 174 and also with suitable damping means, as already described. Numeral 194 indicates a current supply switch.

The production problem is assumed to require the continuous supply of flour of a given grade at a constant rate of flow to a desired processing point. The flour is gravitationally delivered to the weigher from the hopper 178 over a vibrating screen 179 which may be operated by the vibrator device diagrammatically shown at 180. Numeral 181 indicates a suitable control, terminal and switching device. The stream of flour which is moved by the conveyor means within the casing 173 is maintained at a constant rate of flow by coaction of the contact member 182 with electrical contacts diagrammatically shown at the right thereof, which in turn control the operation of the vibrator 180 to increase or to reduce the feed from the hopper 178, as may be required. The counterweight 175 is initially set so as to keep the weighing beam in equilibrium at a zero position so long as the stream of flour flows through the apparatus at a predetermined rate. If this rate changes for any reason, the beam is unbalanced, either in clockwise or in counterclockwise direction, depending on whether the rate of flow increased or decreased, respectively, and an electrical impulse is delivered over the control box 181 to the actuator of the vibrator device 180 which causes corresponding decrease of the feed from the hopper 178, or increase thereof, respectively, to compensate for the unbalance condition of the beam until the balance is restored when the feed is at the normal predetermined rate of flow. The flow of material is thus kept at a constant rate for delivery from the discharge 177 to the desired processing point.

The apparatus functions, as above described, as a gravimetric feeder. Its advantage, as compared with known gravimetric feeders, resides in reliable operation at a high degree of accuracy, due to the fact that the weighing operation is not adversely affected by the positive and the negative impacts of the material falling on the weighing beam and leaving the beam for discharge therefrom.

The apparatus may also be equipped with metering, for example, with desired indicating and recording means, to function as a flowmeter. A tongue 184, as shown in connection with the device in the lower portion of Fig. 14, may for this purpose be provided on the casing 173, to transmit the equilibrium condition as well as unbalance conditions of the weighing beam due to feed load fluctuations for indicating purposes to a scale 185. The latter may coact with a recorder, generally indicated at 186, for furnishing a permanent record of the gravimetric feed and flowmetering control operations.

Different types of known and suitable control, indicating and recording means may be used in place of those shown at 182 and 184—185, respectively. For example, the weighing beam may be provided with a control element corresponding to the tongue 184 and coacting with an electrical resistor which reacts to pressure variations caused by load fluctuations of the beam. The current variations produced by the resistor may in turn be used for any metering, for example, for any desired control, indicating or recording purposes, including remote recording. Alternatively, it is also possible to employ known hydraulically operating means or air-pressure means responsive to load fluctuations of the beam, for desired control and/or metering purposes. In fact, any known and suitable type of operating means may be used for obtaining the desired control and/or metering results. The stream of material, which is fed to the weighing beam from the hopper 178, may likewise be controlled and kept at a constant rate of flow by such different control and operating means.

Several units, each as shown in the upper part of Fig. 14, each operating as a gravimetric feeder and/or as a flowmeter, as described above, may be provided in a flour mill, each for handling a different grade of flour, and remote recording may be obtained on a simple multiple potentiometer recorder, thus giving a record of the operating conditions of several continuous streams of flour in the production process.

It will be clear that any one of the other embodiments previously described with reference to Figs. 6–7, 8–9, 10–11 and 12–13, respectively, may be used as a gravimetric feeder and/or flowmeter, in place of the unit described above with reference to the upper part of Fig. 14.

Any one of these embodiments may also be used, for example, for automatically controlling the addition of desired matter to a stream of grain or flour in a flour mill. Such matter may be a liquid, as, for example, tempering water, to be added to a stream of grain; or it may be a powdered solid substance, as, for example, a vitamin, powdered egg or milk, to be added to a stream of flour. Such matter must be supplied, in either case, in predetermined proportion to the corresponding material flow and, since the momentary rate of feed of such material flow may fluctuate, there must be provided means for varying the amounts of matter, water or vitamin, respectively, to be added so as to compensate for the fluctuations in the feed.

Referring again to the apparatus shown in the upper part of Fig. 14, above the dot-dash line, it will be assumed, first, that a stream of grain is delivered to the inlet 176 by a suitable feeder and, second, that tempering water is to be added to the grain in definite substantially constant proportional relationship. The tempering water may be added to the stream of grain by a valved conduit either at a point preceding the inlet 176 or directly to the weighing beam through a conduit provided thereon, for example, in or near the wall of the inlet. The weighing beam is first adjusted for a predetermined equilibrium, that is, for a load which corresponds to a predetermined rate of feed of grain and water added thereto. The water supply may in such case be controlled in a similar manner as the feed supply is controlled by the vibrator device 180 shown in Fig. 14; that is, the valve of the water supply conduit may be operable by a suitable actuator and the latter may be governed by control means corresponding to the vibrator device 180. In case the equilibrium of the weighing beam is disturbed due to fluctuations in the rate of feed of the grain, the resulting unbalance of the beam will again actuate the contact finger 182 relative to the associated contacts so as to cause actuation of the control means for the water supply valve to adjust the rate of water delivery as may be required, generally in the same manner as the control is used for governing the hopper feed described before. Desired metering, that is, indicating and recording of the operations, may again be provided for, as already described.

The use of the apparatus in a processing step requiring the addition of solid matter such as powdered vitamin to flour may proceed in analogous manner. The flour stream is delivered to the inlet 176 by suitable feeder means which may be subject to fluctuations in the rate of delivery flow. The vitamin may be supplied from a suitable hopper such as 178 either for delivery to the incoming stream of flour before such stream enters the inlet 176, or for delivery directly to the weigher beam through a conduit disposed on or near the inlet. The equilibrium of the weighing beam is adjusted by the counterweight 175 to a load corresponding to the weight of the enriched flour moving along its lateral paths within the casing 173 of the weighing beam. Any condition of unbalance of the beam due to variations in the rate of flow of the flour is signalled, as before, to a control device such as 180 which adjusts the supply of vitamin to compensate for the unbalance. Metering of the operation may be accomplished as already explained.

Any one of the embodiments of the invention may also be used, for example, for extracting a liquid or volatile constituent from a given feed, for example, for extracting water, by evaporation, from a continuous stream of flour for the purpose of continuously determining the moisture content thereof. Two weigher or scale units may be employed for this purpose, as shown in Fig. 14, one unit, namely, the top unit, functioning in the nature of a gravimetric feeder, as already described, for feeding a continuous stream of flour at a constant rate of flow to the unit at the bottom of the figure, which operates as an evaporator and as a weigher for the flour from which the moisture has been extracted.

The unit shown at the bottom of Fig. 14 is assumed to be similar to the top unit; that is, it is assumed to correspond structurally, just like the top unit, to the apparatus shown in Figs. 1, 2 and 3, with the exception that the casing, which houses the screw conveyors, is provided with suitable heating means, for example, with a known strip heater comprising the strips 188 covered by an insulating jacket 189. Any one of the embodiments shown in Figs. 6-7, 8-9, 10-11 and 12-13, respectively, may of course be similarly equipped with heating means for use in similar circumstances. Numeral 190 indicates terminal means for connecting current to the strip heater over the conductors 191. The motor unit, as well as the counterweight and the pivotal mounting of the weigher beam, corresponds to the structure already described. The inlet is provided with a funnel 192 extending upwardly to receive material at a constant rate of flow from the outlet 177 of the feeder unit on top of the figure. The outlet feeds into the discharge funnel 193. All current connections should be of the frictionless type, as already mentioned, and suitable damping means may likewise be provided in accordance with previously made explanations.

The weigher and evaporator unit is equipped with suitable metering control means shown conveniently in the form of the tongue 184 which transmits unbalance conditions due to load fluctuations to the scale 185 coacting with the recorder 186 in the manner explained before. The heating means surrounding the conveyor casing of the weigher beam causes evaporation of moisture from the stream of flour moving therethrough at a substantially constant rate of flow. The weigher beam is adjusted to remain in equilibrium position which corresponds to the weight of the flour carrying a predetermined amount of moisture and moving at a constant rate through the beam. Since the moisture is being evaporated, the beam will be unbalanced in accordance with the weight of moisture extracted from the flour, and the momentary condition of unbalance of the beam is therefore an indication of the moisture content. The scale 185 may be calibrated in terms of moisture content, giving direct reading, and the recorder 186 furnishes a permanent record of the moisture content of the flour. Other known types of metering means may be employed, as discussed before.

A different known type of gravimetric feeder for supplying the stream of flour to the evaporator unit shown in Fig. 14 may be employed, if desired, in place of the structure shown in the upper part of the figure, above the dot-dash line.

The identical arrangement may also be used in different fields, for example, in the processing of oil seeds, to meter the amount of solvent residue remaining in oil seed meal after the processing thereof. An example may be given, referring to the processing of soya beans. The ground beans are mixed with a suitable volatile solvent such as hexane, for the extraction of the oil, and the bulk of the solvent is subsequently recovered. It is of some importance in such a process to obtain information with regard to the amount of residual solvent in the soya meal. The arrangement shown in Fig. 14 may be employed for the purpose of continuously checking soya meal so as to obtain a continuous record of its residual solvent content.

The soya meal, after processing, is for the above noted purpose supplied in a continuous stream at a substantially constant rate of flow to the evaporator unit shown at the bottom of Fig. 14, in the same manner as explained before in connection with flour supplied thereto for the purpose of checking and metering the moisture content thereof. The residual solvent in the stream of soya meal which is being moved through the heated evaporator and weigher is volatilized, that is, extracted from the meal. The weighing beam is preadjusted by means of the counter-balance weight to remain in equilibrium in the presence of a predetermined load of the stream of material moving through the weigher unit, which corresponds to the weight of the soya meal containing a predetermined amount of residual solvent. Removal of this predetermined amount of solvent by volatilizing it will result in a certain unbalance of the weigher beam which will be metered as before and, so long as this condition prevails, the device will merely tell that the soya meal contains the corresponding amount of residual solvent which may be a predetermined permissible minimum. Fluctuations in the amount of residual solvent in the meal above or below the predetermined amount will be reflected in corresponding unbalance variations of the weighing beam in the same manner as fluctuations in the moisture content of flour (the feed of the material being continuous, at a constant rate of flow) are reflected by beam unbalance variations before, and such unbalance variations are again transmitted to the scale 185 and to the recorder 186 for metering purposes, that is, for indicating and recording purposes. The scale may in this case be calibrated in terms of percentage of solvent content instead of moisture content.

Specific electrical heating means have been shown in connection with the evaporator unit, but different known and suitable heating means may of course be used. Among these known means may be mentioned the use of air injected into the conveyor casing through heated conduit means from a suitable blower operated by the motor unit. The drying of the material, or, rather to say, the extraction of liquid or volatile matter therefrom, may also be accomplished by means of infrared heating of the conveyor casing, in which case the casing must of course be made of material which is permeable by infrared rays. The conveyor casing may also be provided with known electronic heating means, in which case care must be taken to avoid the electronic heating of portions of the system which are outside of the zone or zones in which the heating is to be accomplished. It is understood of course that all connections with the conveyor casing of the weighing beam and all couplings therewith, of whatever heating means, should be made substantially frictionless.

The extraction of liquid or volatile matter from a material, taking place in the unit, is efficient and requires only a minimum amount of time, due to the manner of moving the material by the conveyor means, especially the screw conveyor means, which causes a continuous turnover of the particles, thus continuously exposing changed surfaces thereof to heating.

The heating of the material moving through the unit shown at the bottom of Fig. 14 may also be accomplished by heating means disposed inside of the corresponding conveyor casing. For example, as indicated before, in describing the structural features of the embodiments shown in Figs. 1–3, 4–5, 6–7, 8–9, 10–11 and 12–13, respectively, suitable interior heating means may be provided in the structure of Figs. 1–3 and 4–5, respectively, within the longitudinally extending spaces between the upper and the lower tubular casings 11/12 and 51/52, respectively, which are closed to the outside by the corresponding side walls. In the embodiment having the coaxial screw conveyors, Figs. 6–7, interior heating means may be similarly disposed within an annular space formed by a double-walled inner tubular casing provided in place of the inner casing 98. Similar interior heating means may be employed in the embodiment shown in Figs. 8–9, by forming therein a double-walled partition which spearates the lower flight of the upper conveyor belt 145 from the upper flight of the lower belt 146, and disposing the heating means in the longitudinal space formed by such double-walled partition. And finally, interior heating means may be analogously provided in the embodiments shown in Figs. 10–13, by forming one or the other or all the walls of the U-trough as double wall or walls and disposing heating means therein.

The interior heating means described above or the exterior heating means shown in Fig. 14 may be used in any one embodiment alone or in conjunction with the other, as may be desired.

The sequence of steps in the operations described before, referring to the determination of the moisture content in flour and to the determination of the residual solvent content in processed soya meal, respectively, may be modified by the provision of means for heating the corresponding stream of material while the material moves from the feeder unit shown in the upper part of Fig. 14 to the weigher unit indicated in the lower part thereof, before such stream reaches such weigher unit. The heating means provided in conjunction with the weigher unit may be omitted in such a case, the unit functioning in the nature of a device for continuously weighing the stream of material from which the respective liquid or volatile component has been extracted, to detect and to meter beam balance variations corresponding to fluctuations in the amount of the component contained in the feed, moisture or solvent, respectively, which is to be controlled.

The stream of material from the feeder unit is for this purpose directed into a suitable casing, provided with desired heating means, which may be of the type already discussed, to heat the material so as to extract the corresponding liquid or volatile matter therefrom. The dried material is then gravitationally delivered to the inlet of the weigher unit. The casing of the heating means may thus be disposed between the discharge 177 of the feeder device (Fig. 14) and the inlet 192 of the weigher unit. It may comprise a simple tubular funnel of proper length, equipped with the required heating means to accomplish the drying of the material stream on its gravitational path from the feeder to the weigher. If desired, the casing may contain suitable means for interposing a delay in the gravitational flow of the material stream, for example, a vibrating screen, to give sufficient time for the heat treatment.

Examples have been given, of specific solids or liquids, respectively, to be added to specific material streams and of specific liquid or volatile constituents to be extracted from specific materials. These examples have been given only for illustrative purposes and are not intended to indicate any inherent limitations, because different materials may obviously be treated by the apparatus, and the matter to be added thereto or to be extracted therefrom may likewise be different. For example, solid constituents of a material stream, which volatilize in the presence of heat, may be extracted therefrom instead of water from flour for moisture-testing purposes or residual solvent from oil seed meal in the processing of soya beans.

In Fig. 15 is shown a modification of the apparatus forming a weighing beam which comprises a compensating arm disposed at the left and an evaporating and weighing arm disposed at the right of the beam pivots. This embodiment is intended for use as a differential moisture tester, for example, for flour which may be delivered by a suitable gravimetric feeder to the inlet 200. It is assumed in this case that the feeder employed is not accurate in delivering the flour stream at a constant rate of flow. The compensating arm of the structure takes care of substantially compensating for fluctuations in the rate of delivery flow. From the inlet 200, the material is moved laterally to the left by a screw conveyor 201 operable by the motor 202, dropping down into the intermediate portion of the casing in which it is moved by the screw conveyor 203 to the right, the direction of flow of the material being indicated by arrows, laterally beyond the median center line of the inlet 200, dropping at the right end of the conveyor casing downwardly into a bottom casing portion in which the material is moved again to the left by the screw conveyor 204 for discharge through the outlet 205. The axes of the inlet and the outlet intersect the axis of the pivot means, again shown for convenience in the form of wedge-shaped fulcrum members 206 and coacting fulcrum blocks 207, in the same manner as described before. The shaft of the screw conveyor 201 drives the gear wheel 208 which meshes with the gear wheel 209, for driving the screw conveyor 203, the shaft of which carries at the opposite end of the structure the gear wheel 210 meshing with the gear wheel 211, for driving the screw conveyor 204. Suitable heating means may be provided around the casing portion disposed at the right of the pivot means which constitutes the evaporating and weighing arm of the structure. The heating means may be of any suitable kind, as already mentioned, being shown for convenience in the form of heater strips surrounded by an insulating jacket in a similar manner as explained with reference to Fig. 14. The structure thus forms a weigher beam having two arms, one on either side of the pivot means, carrying a tongue 212 coacting with metering means shown in the form of a scale 213, and the latter coacting with the recorder 214. A counterbalance weight 215 is provided for adjusting the beam to remain in equilibrium in the presence of a predetermined load carried at any moment of the weighing operations within the weighing and evaporating arm which is balanced by the compensating arm of the structure. The counterweight has been shown above the weighing and evaporating arm for convenience of representation. It may be disposed, in this as well as in any other embodiment disclosed herein, as may be desired or required.

The conveyor means used in the above described structure comprises screw conveyor elements disposed in parallel relationship alongside one another and is thus derived from the embodiment illustrated in Figs. 1, 2 and 3. Reflection will show, however, that a functionally substantially identical unit may be made by following the teaching of the embodiments disclosed in Figs. 6–7, 8–9, 10–11 or 12–13, respectively. Interior heating means may be provided in the evaporating and weighing arm in accordance with explanations given before.

The operation of the system, for example, in the differential determination of the moisture content of a material, is believed to be self-explanatory from Fig. 15 and from previous explanations. In brief, the material, for example, flour, is gravitationally delivered to the inlet 200, by the feeder means, in a continuous stream at a rate of flow which may fluctuate. The conveyor screws divert the stream laterally of the inlet zone in the direction of the arrows for gravitational discharge at 205. The material moving through the evaporating and weighing arm of the beam is heated, causing evaporation of moisture therefrom. Since the rate of flow of the stream of flour may fluctuate and since the weighing beam is adjusted by means of the counterweight 215 to a certain zero or equilibrium position corresponding to a predetermined rate of flow containing a predetermined amount of moisture, any fluctuation in the rate of flow will unbalance the beam. The corresponding condition of unbalance is metered, that is, it is indicated on the scale 213 in terms of moisture content and is automatically recorded by the recorder 214, as before.

The system shown in Fig. 15 may also be used in analogous manner for checking and metering the residual solvent content in soya meal, after processing thereof, generally in the same manner as described above with reference to its use as a moisture tester for flour. Its use in the volatilizing of a solid constituent of a material and consequent checking and metering of the amount volatilized is believed to be sufficiently obvious from the explanations given previously.

In Fig. 16 is shown a system using the features of the invention for obtaining the differential between two material streams, for example, a stream of wheat and a stream of a certain grade of flour extracted from the wheat, thus functioning in the nature of a weighing device for metering, that is, indicating and recording the percentage of flour extraction from the wheat.

The wheat stream is gravitationally delivered at a predetermined substantially constant rate of flow to the inlet section 220 and is laterally moved by means of the conveyors 221, 222 in the direction of the arrows for gravitational discharge at the section of the outlet from which extends the discharge duct 223. The stream of the grade of flour which has been extracted from the wheat is similarly delivered to the inlet section 224 and is laterally moved by the screw conveyors 225, 226 for gravitational discharge at the section of the outlet from which extends the discharge duct 227. The shaft carrying the screws 221, 225 is driven by the gear wheel 228 which meshes with the motor-driven pinion 229, the latter also driving the gear wheel 230 for rotating the conveyor screws 222, 226. The weigher beam formed by the structure is again pivotally supported by means conveniently shown in the form of wedge-shaped fulcrum members 232 coacting with fulcrum blocks 233 resting on upright supports, as illustrated. The two inlet sections 220, 224 and the two outlet sections provided with the ducts 223, 227 are formed by partition walls 234. The inlet and outlet means (forming the sections 220/224 and 223/227), are thus again respectively disposed in planes along lines lying directly above and below the pivots 232 of the weighing beam and the partitions 234 respectively associated with the inlet and outlet means extend in vertical planes coinciding with a vertical line which intersects the pivot axis so as to direct the feed and discharge along either side of such vertical line to avoid detrimental effects of the positive and negative impacts on the accuracy of the weighing operations. Desired metering means may be employed, shown for convenience again in the form of a tongue 235 coacting with a scale 236 and the latter with a recorder 237. In this particular case the scale may be calibrated in terms of percentage of extraction of flour from the wheat. The weighing beam is initially balanced, by means of the counterweight 231, to a desired zero or equilibrium setting whcih corresponds to a predetermined percentage of extraction of flour from the wheat. In case weight variations in the constant stream of flour should occur, due to fluctuations in the amount of flour extracted from the wheat, the weighing beam will be unbalanced and the extraction fluctuations will be directly indicated on the scale 236 and will be recorded on the recorder 237.

The embodiment discussed above may employ the conveyor structures previously described in the reference to Figs. 6 to 13, which may be arranged in either case in a combination to obtain analogous operations and results.

The invention has been described mainly for use with material such as grain, wheat and flour. It is clear of course that it may likewise be used for handling, processing and controlling different types of flowable solid materials, including gravel, sand, sugar and coal, for example.

Any one of the units disclosed herein may be made in sizes from relatively small instrument type laboratory units for testing purposes to large capacity production control and processing units.

Changes may be made within the scope and spirit of the accompanying claims.

We claim:

1. Continuous weighing apparatus having a weighing beam comprising an elongated casing containing conveyor means, tubular inlet means disposed on top of said casing for gravitationally supplying material to be weighed to said conveyor means, tubular outlet means disposed at the bottom of said casing coaxial with said tubular inlet means for gravitationally discharging weighed material therefrom, fulcrum means for pivotally supporting said casing along a transverse axis which extends intermediate said inlet and outlet means and intersects a line coinciding with the axes thereof, said tubular inlet and outlet means forming in said casing open areas respectively above and below said conveyor means which extend relative thereto and longitudinally thereof substantially equally from either side of the axis of the respective inlet and outlet means so as to direct the respective gravitationally moving material supplied to said conveyor means and moving for discharge therefrom in substantially vertically effective flows along either side of the transversally extending axis of said fulcrum means to cause said fulcrum means to absorb positive and negative impacts produced by said material respectively supplied to said conveyor means and moving therefrom.

2. The structure defined in claim 1, wherein said conveyor means comprises a first screw conveyor element for moving said material supplied thereto angularly away from said inlet means, and a second screw conveyor element disposed coaxial with said first element for thereafter moving said material angularly toward said outlet means for gravitational discharge thereof.

3. The structure defined in claim 2, comprising drive means for said conveyor elements forming part of said weighing beam.

4. The structure defined in claim 2, wherein said conveyor elements are a pair of screw members disposed in parallel relationship.

5. The structure defined in claim 1, wherein said conveyor means comprises a first screw conveyor element for moving said material supplied thereto angularly away from said inlet means, and a second screw conveyor element disposed coaxial with said first element for thereafter moving said material angularly toward said outlet means for gravitational discharge thereof.

6. The structure defined in claim 1, wherein said conveyor means comprises a first belt conveyor element for moving said material supplied thereto angularly away from said inlet means, and a second belt conveyor element disposed in parallel with said first element for thereafter moving said material angularly toward said outlet means for gravitational discharge thereof.

7. The structure defined in claim 2, comprising drive means for said conveyor elements forming part of said weighing beam, means for holding said casing and said drive means to form a unitary substantially horizontally extending structure.

8. The structure defined in claim 2, comprising an elongated casing forming two interior chambers extending in parallel relationship, said conveyor elements comprising a screw disposed in each chamber, drive means for said conveyor elements disposed at one end of said casing outside thereof, frame means for holding said casing and said drive means to form a unitary structure, and means for mounting said fulcrum means on said frame means for pivotally supporting said unitary structure in a substantially horizontal position.

9. The structure defined in claim 1, comprising outer wall means forming an elongated casing, inner wall means in said casing forming with said outer wall means a tubular inner chamber and an annular outer chamber surrounding said inner chamber coaxial therewith, a first screw which constitutes a first element of said conveyor means disposed within said inner chamber, a tubular member rotatably mounted on said inner wall means and carrying fins forming a second screw which constitutes a second element of said conveyor means disposed within said annular outer chamber, a drive gear at one end of said casing outside thereof for rotating said first screw, gear means at the other end of said casing controlled by said first screw for rotating said tubular member carrying the fins forming said second screw, frame means for holding said casing and said drive gear to form a unitary structure, means for mounting said fulcrum means on said frame means for pivotally supporting said unitary structure in a substantially horizontal position, said inlet means being disposed for gravitationally supplying material to said first screw at the inner end thereof for delivery thereby to the second screw at the outer end thereof, said second screw moving said material laterally in reversed direction for gravitational discharge at said discharge means.

10. The structure defined in claim 1, wherein said conveyor means comprises a pair of endless belts disposed in said casing, one above the other, in longitudinally staggered relationship, drive means for said belts outside of said casing at one end thereof, frame means for holding said casing and said drive means to form a unitary structure, means for mounting said fulcrum means on said frame means for pivotally supporting said unitary structure in a substantially horizontal position, said inlet means supplying material to the upper belt for delivery thereby to the lower belt, said lower belt moving said material in reversed direction for gravitational discharge from said casing through said outlet means.

11. The structure defined in claim 1, wherein said conveyor means comprises a pair of endless belts disposed in said casing, one above the other, in longitudinally staggered relationship, drive means for said belts outside of said casing at one end thereof, frame means for holding said casing and said drive means to form a unitary structure, means for mounting said fulcrum means on said frame means for pivotally supporting said unitary structure in a substantially horizontal position, said inlet means being disposed on top of said casing for gravitationally supplying material to the upper belt for delivery thereby to the lower belt, said lower belt moving said material in reversed direction for gravitational discharge from said casing through said outlet means, means for guiding said material from said inlet means onto said upper belt, baffle means for guiding the delivery of said material from said upper belt onto said lower belt, and means for guiding the gravitational discharge of said material from said lower belt to said outlet means.

12. The structure defined in claim 1, for use in determining the percentage of extraction of a predetermined grade of flour from wheat, comprising partition means in said inlet and in said outlet means, respectively, extending in a common vertical plane which coincides with the axes of said inlet and outlet means to form two inlet sections in said inlet means and two outlet sections in said outlet means which are respectively in vertical alignment with said inlet sections, said conveyor means comprising a conveyor element for each of said inlet sections and a conveyor element for each of said outlet sections, means for gravitationally delivering said wheat before extraction of said flour therefrom to one of said inlet sections at a predetermined substantially constant rate of flow for delivery to the conveyor element associated with said one inlet section, means for separately gravitationally delivering the desired grade of flour extracted from said wheat to the other inlet section at a predetermined substantially constant rate of flow for delivery to the conveyor element associated with said other inlet section, means for driving said conveyor elements to move said wheat and said flour symmetrically laterally outwardly away from the corresponding inlet sections therefor for delivery to said conveyor elements respectively associated with said outlet sections, means for driving said last named conveyor elements for moving said wheat and said flour, respectively, laterally inwardly for gravitational discharge each at one of said outlet sections, said weighing beam being balanced to remain in equilibrium for the duration of delivery thereto of wheat and flour in definite proportions corresponding to a predetermined percentage of extraction of flour from said wheat and becoming unbalanced responsive to variations in said proportional relationship, and means for continuously metering the balance and the unbalance conditions of said weighing beam in terms of percentage of extraction of flour from said wheat.

13. The structure defined in claim 1, comprising a pair of conveyor elements constituting said conveyor means, drive means for said conveyor elements outside of said casing at one end thereof and forming a unit therewith which constitutes said weighing beam, means for mounting said fulcrum means for pivotally supporting said weighing beam unit in a normal substantially horizontal position, means for disposing said inlet means at one end of said casing for gravitationally delivering a flowable material to one of said conveyor elements which moves said material within said casing laterally of said inlet means and delivers such material to the other conveyor element which moves the material in a return path toward said outlet means for gravitational discharge from said casing.

14. The structure defined in claim 1, comprising means for balancing said weighing beam in a normal angular position, and means for continuously registering conditions of unbalance of said weighing beam which deviate from said normal angular position.

15. The structure defined in claim 14, comprising means for damping the angular motions of said weighing beam incident to displacement thereof from its normal angular position.

16. The structure defined in claim 14, comprising magnetic means coacting with said fulcrum means having the dual function, namely, first, to dampen the angular motion of said weighing beam incident to displacement thereof from its normal angular position and, second, to exert a lifting force on said fulcrum means so as to reduce the friction thereof.

17. Continuous weighing apparatus having a weighing beam comprising a casing containing conveyor means, inlet means for gravitationally supplying material to be weighed to said conveyor means, outlet means for gravitationally discharging weighed material therefrom, fulcrum means for pivotally supporting said casing along an axis which intersects the axes of said inlet and outlet means, said inlet and outlet means being respectively disposed above and below said conveyor means so as to direct the gravitationally moving material respectively supplied to said conveyor means and moving for discharge therefrom in substantially vertically effective flows with median center lines which intersect the axis of said fulcrum means to cause said fulcrum means to absorb positive and negative impacts produced by said material respectively supplied to said conveyor means and moving therefrom.

18. Apparatus according to claim 17, wherein said conveyor means moves the material gravitationally supplied thereto away from said inlet means and thereafter toward said outlet means for gravitational discharge therethrough.

19. Apparatus according to claim 18, comprising drive means for said conveyor means forming part of said weighing beam.

20. Apparatus according to claim 18, comprising drive means for said conveyor means forming part of said weighing beam, and means for holding said casing and said drive means to form a unitary substantially horizontally extending structure.

21. Apparatus according to claim 20, comprising a casing forming a marginally extending endless channel, conveyor means comprising wiper elements disposed in said channel for movement therealong in a substantially horizontal plane, and means for driving said wiper elements to move material fed through said inlet to said channel away from said inlet for discharge through said outlet.

22. Apparatus according to claim 21, wherein said conveyor means is a Redler-type conveyor.

23. Apparatus according to claim 22, wherein said casing is a circular casing forming a marginally extending endless circular channel.

24. Apparatus according to claim 22, wherein said casing is an elongated casing forming a marginally extending endless channel.

25. Apparatus according to claim 22, comprising a rotatable element for driving said conveyor, a frame extending from said casing, and drive means including a motor mounted on said frame for driving said rotatable element, said frame and said driving means forming with said casing said weighing beam.

26. Apparatus according to claim 25, wherein said rotatable element is a circular plate-like member disposed for movement in a substantially horizontal path and carrying said wiper elements peripherally thereof.

27. Apparatus according to claim 25, wherein said rotatable element is a sprocket wheel, and a chain driven by said sprocket wheel and carrying said wiper elements.

28. Apparatus according to claim 24, comprising spaced apart sprocket wheels, an endless chain extending about said sprocket wheels and carrying said wiper elements, a frame extending from said casing, and drive means including a motor mounted on said frame for driving one of said sprocket wheels, said frame and said driving means forming with said casing said weighing beam.

29. Apparatus according to claim 26, comprising a circular plate mounted on said casing above said circular plate-like member and covering said channel, said inlet means extending from said circular plate.

30. Apparatus according to claim 28, comprising a plate mounted on said casing, said inlet means extending from said plate.

References Cited in the file of this patent

UNITED STATES PATENTS

| | | |
|---|---|---|
| 1,717,564 | Ihlefeldt | June 18, 1929 |
| 2,088,334 | Merchen | July 27, 1937 |
| 2,146,061 | Fasmer | Feb. 7, 1939 |
| 2,371,040 | Fisher et al. | Mar. 6, 1945 |
| 2,549,908 | Johansen | Apr. 24, 1951 |
| 2,635,734 | Hampton | Apr. 21, 1953 |

FOREIGN PATENTS

| | | |
|---|---|---|
| 808,790 | Germany | July 19, 1951 |